(12) United States Patent
Hasegawa et al.

(10) Patent No.: US 10,396,394 B2
(45) Date of Patent: Aug. 27, 2019

(54) METHOD FOR PRODUCING SULFIDE ALL-SOLID-STATE BATTERY AND SULFIDE ALL-SOLID-STATE BATTERY

(71) Applicant: TOYOTA JIDOSHA KABUSHIKI KAISHA, Toyota-shi, Aichi-ken (JP)

(72) Inventors: Hajime Hasegawa, Susono (JP); Norihiro Ose, Sunto-gun (JP); Kengo Haga, Susono (JP); Mitsutoshi Otaki, Susono (JP); Keisuke Omori, Kariya (JP); Takeshi Tojigamori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 15/377,418

(22) Filed: Dec. 13, 2016

(65) Prior Publication Data
US 2017/0200972 A1   Jul. 13, 2017

(30) Foreign Application Priority Data

Jan. 12, 2016   (JP) ................................ 2016-003603
Oct. 14, 2016   (JP) ................................ 2016-202880

(51) Int. Cl.
 *H01M 10/0562* (2010.01)
 *H01M 6/18* (2006.01)
 *H01M 10/44* (2006.01)
(52) U.S. Cl.
 CPC ......... *H01M 10/0562* (2013.01); *H01M 6/18* (2013.01); *H01M 10/446* (2013.01); *H01M 2300/0068* (2013.01)

(58) Field of Classification Search
 CPC ... H01M 10/0562; H01M 10/446; H01M 6/18
 See application file for complete search history.

(56) References Cited

U.S. PATENT DOCUMENTS

| 4,965,151 A | * | 10/1990 | Takada | ................... | B82Y 10/00 |
| | | | | | 429/219 |
| 2011/0274974 A1 | * | 11/2011 | Sabi | ..................... | H01M 2/0212 |
| | | | | | 429/220 |
| 2015/0325844 A1 | | 11/2015 | Inoue | | |

FOREIGN PATENT DOCUMENTS

| CN | 104937749 A | 9/2015 | |
| JP | 2003-217671 A | 7/2003 | |
| JP | 2004-139961 A | 5/2004 | |
| JP | 2011-086555 A | 4/2011 | |
| JP | 2012-094445 A | 5/2012 | |
| JP | 2013-098024 A | 5/2013 | |
| JP | 2014-086209 A | 5/2014 | |
| JP | 2014-143133 A | 8/2014 | |
| WO | WO-2014115604 A1 * | 7/2014 | ........ H01M 10/0562 |

\* cited by examiner

*Primary Examiner* — Jimmy Vo
(74) *Attorney, Agent, or Firm* — Oliff PLC

(57) ABSTRACT

A method for producing a sulfide all-solid-state battery with a high capacity retention rate, and a sulfide all-solid-state battery with a high capacity retention rate. The method for producing a sulfide all-solid-state battery may comprise forming a sulfide all-solid-state battery, initially charging the sulfide all-solid-state battery after the forming of the sulfide all-solid-state battery, and exposing the sulfide all-solid-state battery to an oxygen-containing gas atmosphere at at least any one of a time of the initially charging of the sulfide all-solid-state battery and a time after the initially charging of the sulfide all-solid-state battery.

2 Claims, 4 Drawing Sheets

METHOD FOR PRODUCING SULFIDE ALL-SOLID-STATE BATTERY AND SULFIDE ALL-SOLID-STATE BATTERY

TECHNICAL FIELD

The disclosure relates to a method for producing a sulfide all-solid-state battery and a sulfide all-solid-state battery.

BACKGROUND

In the field of all-solid-state batteries, there is an attempt to focus on battery charge and discharge and improve the performance of all-solid-state batteries.

For example, a sulfide all-solid-state battery is disclosed in Patent Literature 1, which is configured to be charged and discharged in an argon gas atmosphere.

Meanwhile, there is an attempt to focus on the surface of a sulfide-based solid electrolyte and improve the performance of sulfide all-solid-state batteries.

For example, an all-solid-state battery is disclosed in Patent Literature 3, the battery comprising such a sulfide-based solid electrolyte that a surface thereof is oxidized to form an oxide layer.

Patent Literature 1: Japanese Patent Application Laid-Open (JP-A) No. 2014-143133
Patent Literature 2: JP-A No. 2014-086209
Patent Literature 3: JP-A No. 2012-094445

SUMMARY

However, the conventional sulfide all-solid-state battery as disclosed in Patent Literature 1 is problematic in that the capacity retention rate is decreased by lithium deactivation, etc., in the anode.

The disclosed embodiments were achieved in light of the above circumstance. An object of the disclosure is to provide a method for producing a sulfide all-solid-state battery with a high capacity retention rate, and a sulfide all-solid-state battery with a high capacity retention rate.

In a first embodiment, there is provided a method for producing a sulfide all-solid-state battery, comprising forming a sulfide all-solid-state battery, initially charging the sulfide all-solid-state battery after the forming of the sulfide all-solid-state battery, and exposing the sulfide all-solid-state battery to an oxygen-containing gas atmosphere at at least any one of a time of the initially charging of the sulfide all-solid-state battery and a time after the initially charging of the sulfide all-solid-state battery.

For the method for producing the sulfide all-solid-state battery, in the initially charging of the sulfide all-solid-state battery, the sulfide all-solid-state battery may be initially charged in the oxygen-containing gas atmosphere, and after the initially charging of the sulfide all-solid-state battery, the sulfide all-solid-state battery may be exposed to the oxygen-containing gas atmosphere.

For the method for producing the sulfide all-solid-state battery, in the initially charging of the sulfide all-solid-state battery, the sulfide all-solid-state battery may be initially charged in the oxygen-containing gas atmosphere to set a potential of an anode of the sulfide all-solid-state battery to 0.85 V (vs. Li/Li$^+$) or less.

In another embodiment, there is provided a sulfide all-solid-state battery comprising: a cathode comprising a cathode active material layer that contains a cathode active material, an anode comprising an anode active material layer that contains an anode active material, and a solid electrolyte layer being disposed between the cathode and the anode and containing a solid electrolyte, wherein at least any one of the anode active material layer and the solid electrolyte layer contains a sulfide-based solid electrolyte, and the sulfide-based solid electrolyte comprises a high oxygen concentration layer on a surface in contact with the anode active material, the high oxygen concentration layer having a higher oxygen concentration than other parts except the contact surface.

According to the disclosed embodiments, the method for producing a sulfide all-solid-state battery with a high capacity retention rate, and a sulfide all-solid-state battery with a high capacity retention rate can be provided.

DETAILED DESCRIPTION

Hereinafter, the method for producing a sulfide all-solid-state battery and the sulfide all-solid-state battery according to the disclosed embodiments will be described in detail.

A. Method for Producing a Sulfide all-Solid-State Battery

The method for producing a sulfide all-solid-state battery comprises forming a sulfide all-solid-state battery, initially charging the sulfide all-solid-state battery after the forming of the sulfide all-solid-state battery, and exposing the sulfide all-solid-state battery to an oxygen-containing gas atmosphere at at least any one of a time of the initially charging of the sulfide all-solid-state battery and a time after the initially charging of the sulfide all-solid-state battery.

It was found that the capacity retention rate of a sulfide all-solid-state battery is markedly increased by initially charging the sulfide all-solid-state battery in an oxygen-containing gas atmosphere and/or exposing the sulfide all-solid-state battery to an oxygen-containing gas atmosphere after the initial charging.

The reason is supposed as follows: a shift from an inert gas atmosphere (e.g., argon gas) to the oxygen-containing gas atmosphere alters the solid electrolyte contained in the anode of the sulfide all-solid-state battery and then makes the solid electrolyte less likely to change (deteriorate). As the basis for this, it was confirmed that when the voltage after the initial charging was controlled to 3.65 V and the sulfide all-solid-state battery was exposed to an oxygen-containing gas atmosphere, the voltage of the sulfide all-solid-state battery changed from 3.65 V to about 3.55 V.

The all-solid-state battery production method according to the disclosed embodiments comprises at least (1) the battery forming and (2) the initial charging.

(1) Battery Forming

The battery forming is forming a sulfide all-solid-state battery.

The sulfide all-solid-state battery includes at least the cathode, the anode and the solid electrolyte layer disposed between the cathode and the anode.

The sulfide all-solid-state battery formed by the battery forming is a battery that is in a state of being able to charge and discharge.

Figure 1:
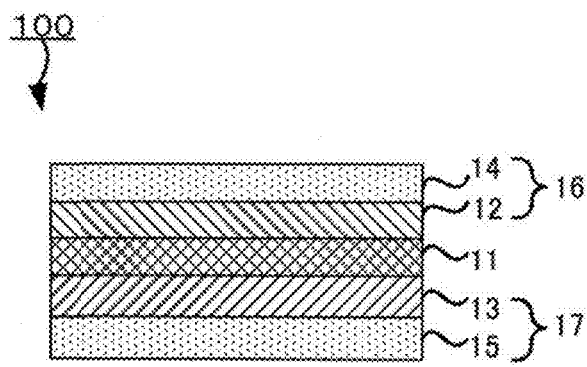
FIG. 1 is a schematic sectional view of an example of a sulfide all-solid-state battery formed by battery forming.

FIG. 1 is a schematic sectional view of an example of the sulfide all-solid-state battery formed by the battery forming according to the disclosed embodiments.

A sulfide all-solid-state battery 100 includes a cathode 16, an anode 17 and a solid electrolyte layer 11. The cathode includes a cathode active material layer 12 and a cathode current collector 14. The anode 17 includes an anode active material layer 13 and an anode current collector 15. The solid electrolyte layer 11 is disposed between the cathode 16 and the anode 17.

The cathode comprises at least the cathode active material layer. As needed, it may further include the cathode current collector.

The cathode active material layer contains at least the cathode active material. As needed, it may contain a conductive material, a binder, and a solid electrolyte that will be described below.

As the cathode active material, conventionally known materials may be used. When the sulfide all-solid-state battery is a lithium battery, for example, materials such as lithium cobaltate ($LiCoO_2$), lithium nickelate ($LiNiO_2$), $Li_{1+x}Ni_{1/3}Mn_{1/3}Co_{1/3}O_2$ ($0 \leq x < 0.3$), lithium manganate ($LiMn_2O_4$), different element-substituted Li—Mn spinels represented by the composition formula $Li_{1+x}Mn_{2-x-y}M_yO_4$ (where M is at least one element selected from the group consisting of Al, Mg, Co, Fe, Ni and Zn; $0 \leq x < 0.5$; and $0 \leq y < 2$), lithium titanate and lithium metal phosphate ($LiMPO_4$, M=Fe, Mn, Co, Ni) may be used.

The form of the cathode active material is not particularly limited. As the form, examples include, but are not limited to, a particulate form and a plate form.

The cathode active material may comprise such a coating layer that the surface of the cathode active material is coated with the solid electrolyte.

The method for coating the surface of the cathode active material with the solid electrolyte is not particularly limited. As the method, examples include, but are not limited to, a method of coating the cathode active material with the solid electrolyte (e.g., $LiNbO_3$) in the air environment by use of a tumbling/fluidizing coater (manufactured by Powrex Corporation) and firing the cathode active material coated with the solid electrolyte in the air environment. The examples also include, but are not limited to, a sputtering method, a sol-gel method, an electrostatic spraying method and a ball milling method.

The solid electrolyte used to form the coating layer may be a substance that has lithium ion conductivity and that is not fluidized and keeps the coating layer form even when it is brought into contact with an active material or solid electrolyte. As the method, examples include, but are not limited to, $LiNbO_3$, $Li_4Ti_5O_{12}$ and $Li_3PO_4$.

Also, the solid electrolyte used for the cathode active material layer may be the same as the solid electrolyte used for the below-described solid electrolyte layer.

The binder is not particularly limited. As the binder, examples include, but are not limited to, butadiene rubber (BR), polyvinylidene fluoride (PVdF) and styrene-butadiene rubber (SBR).

The conductive material is not particularly limited. As the conductive material, examples include, but are not limited to, metal materials and carbonaceous materials such as Acetylene Black, Ketjen Black and carbon fibers.

The thickness of the cathode active material layer is not particularly limited. For example, it may be 10 to 250 μm or 20 to 200 μm.

The content of the cathode active material in the cathode active material layer is not particularly limited. For example, it may be 50% by volume to 90% by volume.

The cathode current collector functions to collect current from the cathode active material layer. As the material for the cathode current collector, examples include, but are not limited to, metal materials such as SUS, Ni, Cr, Au, Pt, Al, Fe, Ti and Zn. As the form of the cathode current collector, examples include, but are not limited to, a foil form, a plate form and a mesh form.

The cathode may further include a cathode lead that is connected to the cathode current collector.

In the disclosed embodiments, the average particle diameter of particles is calculated by a general method. An example of the method for calculating the average particle diameter of particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

The anode comprises at least the anode active material layer. As needed, it may include the anode current collector for collecting current from the anode active material layer.

The anode active material layer contains at least the anode active material. As needed, it may contain a conductive material, a binder and the below-described solid electrolyte.

As the anode active material, examples include, but are not limited to, carbonaceous materials such as graphite and hard carbon, Si and Si alloys, and $Li_4Ti_5O_{12}$.

The form of the anode active material is not particularly limited. As the form, examples include, but are not limited to, a particulate form and a plate form.

The conductive material and binder used for the anode active material layer may be the same as those used for the above-described cathode active material layer. The solid electrolyte used for the anode active material layer may be the same as the solid electrolyte used for the below-described solid electrolyte layer.

The thickness of the anode active material layer is not particularly limited. For example, it may be 10 to 100 μm or 10 to 50 μm.

The content of the anode active material in the anode active material layer is not particularly limited. For example, it may be 20% by volume to 90% by volume.

As the material for the anode current collector, examples include, but are not limited to, metal materials such as SUS, Cu, Ni, Fe, Ti, Co and Zn. The form of the anode current collector may be selected from those provided above as the examples of the form of the cathode current collector.

The solid electrolyte layer contains at least the solid electrolyte. As needed, it may contain a binder, etc.

The solid electrolyte may be a sulfide-based solid electrolyte. As the sulfide-based solid electrolyte, examples include, but are not limited to, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—

P₂S₅, LiI—Li₂O—Li₂S—P₂S₅, LiBr—LiI-Li₂S—P₂S₅, and Li₂S—P₂S₅. More specifically, examples include, but are not limited to, 15LiBr.10LiI.75(0.75Li₂S.0.25P₂S₅) and 70(0.06Li₂O.0.69Li₂S.0.25P₂S₅).30LiI.

The form of the solid electrolyte is not particularly limited. As the form, examples include, but are not limited to, a particulate form and a plate form.

The binder used for the solid electrolyte layer may be the same as the binder used for the above-described cathode active material layer.

As needed, the sulfide all-solid-state battery may include an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resins.

In the case of such a sulfide all-solid-state battery that the outer casing is in a laminate form, the sulfide all-solid-state battery may be a battery obtained by, after being initially charged in the oxygen-containing gas atmosphere, being formed into a laminate during vacuum suction, or it may be a battery obtained by, after being initially charged in the oxygen-containing gas atmosphere, being formed into a laminate in an argon gas atmosphere.

(2) Initial Charging

The initial charging is initially charging the sulfide all-solid-state battery after the forming of the sulfide all-solid-state battery.

In the disclosed embodiments, the sulfide all-solid-state battery is exposed to an oxygen-containing gas atmosphere at at least any one of the time of the initially charging of the sulfide all-solid-state battery and the time after the initially charging of the sulfide all-solid-state battery.

Then, from the viewpoint of increasing the capacity retention rate of the sulfide all-solid-state battery, the sulfide all-solid-state battery may be exposed to an oxygen-containing gas atmosphere at both the time of the initially charging of the sulfide all-solid-state battery and the time after the initially charging of the sulfide all-solid-state battery.

The initial charging condition is not particularly limited. As the condition, examples include, but are not limited to, charging at constant current-constant voltage. The current value is not particularly limited. For example, it may be 0.1 mAh to 10 mAh. This is because the battery needs a long time to charge when the current value is too small, and a large overvoltage occurs when the current value is too large.

As the oxygen-containing gas, examples include, but are not limited to, pure oxygen and air. The air may be dry air.

When the initial charging is carried out in the oxygen-containing gas atmosphere, the battery may be charged until the potential of the anode reaches 0.85 V (vs. Li/Li⁺) or less. Also, the battery may be charged until the anode potential reaches 0.70 V (vs. Li/Li⁺) or less. This is because the capacity retention rate can be further increased by charging the battery until the anode potential reaches the above-mentioned range.

(3) After Initial Charging

The open-circuit voltage of the sulfide all-solid-state battery after the initial charging is not particularly limited. It may be kept at 2.80 V or more and 3.8 V or less.

The time of exposure to the oxygen-containing gas atmosphere after the initial charging is not particularly limited. It may be 24 hours to 30 days.

The exposure temperature is not particularly limited. It may be 0 to 60° C.

The oxygen-containing gas may be selected from those provided above as the examples of the oxygen-containing gas used in the initial charging.

As the sulfide all-solid-state battery obtained by the production method of the disclosed embodiments, examples include, but are not limited to, a lithium battery, a sodium battery, a magnesium battery and a calcium battery. Of them, the sulfide all-solid-state battery may be a lithium battery.

B. Sulfide All-Solid-State Battery

The sulfide all-solid-state battery comprises: a cathode comprising a cathode active material layer that contains a cathode active material, an anode comprising an anode active material layer that contains an anode active material, and a solid electrolyte layer being disposed between the cathode and the anode and containing a solid electrolyte, wherein at least any one of the anode active material layer and the solid electrolyte layer contains a sulfide-based solid electrolyte, and the sulfide-based solid electrolyte comprises a high oxygen concentration layer on a surface in contact with the anode active material, the high oxygen concentration layer having a higher oxygen concentration than other parts except the contact surface.

It was found that the capacity retention rate of the sulfide all-solid-state battery is markedly increased by forming the high oxygen concentration layer on the contact surface of the sulfide-based solid electrolyte with the anode active material, the high oxygen concentration layer having a higher oxygen concentration than other parts except the contact surface, by initially charging the sulfide all-solid-state battery in an oxygen-containing gas atmosphere.

This is supposed to be because the thus-formed high oxygen concentration layer prevents contact between the anode active material and the sulfide-based solid electrolyte and makes the sulfide-based solid electrolyte less likely to change (deteriorate).

Figure 2:
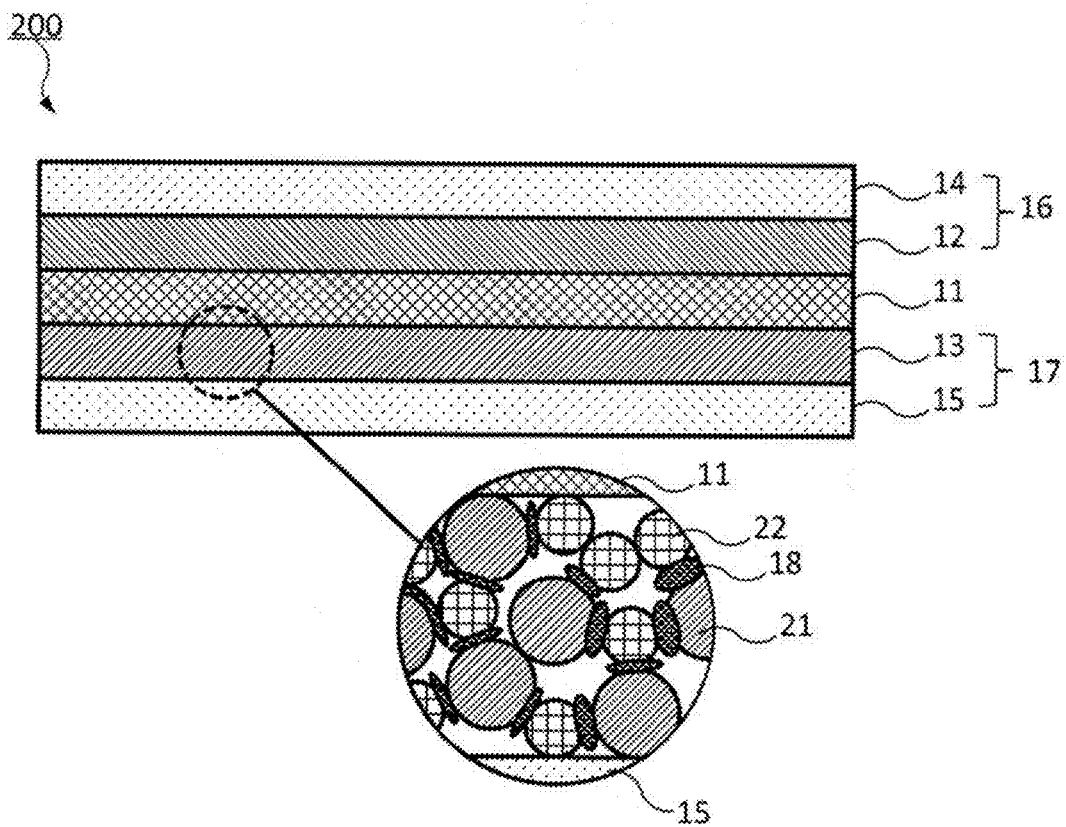
FIG. 2 is a schematic sectional view of an example of another sulfide all-solid-state battery.

FIG. 2 is a schematic sectional view of an example of the sulfide all-solid-state battery of the disclosed embodiments.

A sulfide all-solid-state battery 200 includes the cathode 16, the anode 17 and the solid electrolyte layer 11. The cathode 16 includes the cathode active material layer 12 and the cathode current collector 14. The anode 17 includes the anode active material layer 13 and the anode current collector 15. The solid electrolyte layer 11 is disposed between the cathode 16 and the anode 17. Also, the anode active material layer 13 includes an anode active material 21, a sulfide-based solid electrolyte 22, and a high oxygen concentration layer 18 on a contact surface between the anode active material 21 and the sulfide-based solid electrolyte 22.

Figure 3:
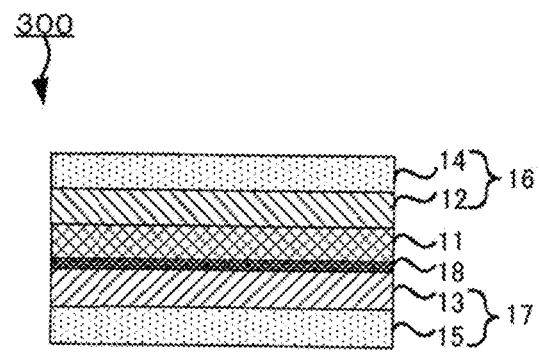
FIG. 3 is a schematic sectional view of an example of another sulfide all-solid-state battery.

FIG. 3 is a schematic sectional view of an example of the sulfide all-solid-state battery of the disclosed embodiments.

A sulfide all-solid-state battery 300 includes the cathode 16, the anode 17 and the solid electrolyte layer 11. The cathode 16 includes the cathode active material layer 12 and the cathode current collector 14. The anode 17 includes the anode active material layer 13 and the anode current collector 15. The solid electrolyte layer 11 is disposed between the cathode 16 and the anode 17. Also, the solid electrolyte layer 11 includes the high oxygen concentration layer 18 on a surface in contact with the anode active material layer 13.

Hereinafter, the components of the sulfide all-solid-state battery will be described.

(1) Cathode

The cathode comprises at least the cathode active material layer. As needed, it may include a cathode current collector for collecting current from the cathode active material layer.

The cathode active material layer contains at least the cathode active material. As needed, it may contain a conductive material, a binder and a solid electrolyte.

The cathode current collector, the cathode active material, the conductive material, the binder and the solid electrolyte may be the same as those described above under "A. Method for producing a sulfide all-solid-state battery".

(2) Anode

The anode comprises at least the anode active material layer. As needed, it may include an anode current collector for collecting current from the anode active material layer.

The anode active material layer contains at least the anode active material. As needed, it may contain a conductive material, a binder and a solid electrolyte.

At least any one of the anode active material layer and the below-described solid electrolyte layer contains the sulfide-based solid electrolyte.

The anode current collector, the anode active material, the conductive material, the binder and the solid electrolyte are the same as those described above under "A. Method for producing a sulfide all-solid-state battery".

(3) Solid Electrolyte Layer

The solid electrolyte layer contains at least the solid electrolyte. As needed, it may contain a binder, etc.

At least any one of the above-described anode active material layer and solid electrolyte layer contains the sulfide-based solid electrolyte.

The solid electrolyte and the binder may be the same as those described above under "A. Method for producing a sulfide all-solid-state battery".

(4) High Oxygen Concentration Layer

The high oxygen concentration layer is a layer that is formed on the contact surface with the anode active material of the sulfide-based solid electrolyte and that has a higher oxygen concentration than other parts except the contact surface. The high oxygen concentration layer may be formed on the contact surface between the anode active material and sulfide-based solid electrolyte in the anode active material layer, or it may be formed on the contact surface between the anode active material layer and the solid electrolyte layer that contains the sulfide-based solid electrolyte. As the method for forming the high oxygen concentration layer, examples include, but are not limited to, a method of exposing the sulfide all-solid-state battery to an oxygen-containing gas atmosphere at at least any one of the time of the initial charging of the sulfide all-solid-state battery and the time after the initially charging of the sulfide all-solid-state battery. The method for forming the high oxygen concentration layer may be a method of exposing the sulfide all-solid-state battery to an oxygen-containing gas atmosphere at both the time of the initial charging of the sulfide all-solid-state battery and the time after the initially charging of the sulfide all-solid-state battery. This is because the high oxygen concentration layer can be formed more efficiently.

Also, the high oxygen concentration layer may be formed only on the contact surface of the sulfide-based solid electrolyte with the anode active material. This is because the ion conductivity of the sulfide-based solid electrolyte may decrease when the high oxygen concentration layer is formed on many parts except the contact surface with the anode active material.

The average thickness of the high oxygen concentration layer is not particularly limited. For example, it may be 0.1 nm or more, or it may be 1 nm or more. Also, it may be 100 nm or less, or it may be 10 nm or less. The average thickness of the high oxygen concentration layer may be obtained by observation with a scanning electron microscope (SEM) or a transmission electron microscope (TEM), for example.

The formation state of the high oxygen concentration layer may be confirmed by X-ray diffraction (XRD) measurement, TEM-EDX (transmission electron microscope-energy dispersive X-ray spectroscope) analysis, STEM-EDX (scanning transmission electron microscope-energy dispersive X-ray spectroscope) analysis, RBS (Rutherford backscattering spectrometry), PIXE (particle induced X-ray emission) analysis, HFS (hydrogen forward scattering) analysis or NRA (nuclear reaction analysis), for example.

(5) Other Components

As needed, the sulfide all-solid-state battery includes the outer casing for housing the cathode, the anode and the solid electrolyte layer.

As the form of the outer casing, examples include, but are not limited to, a coin form, a laminate form, a cylindrical form and a square form.

The material for the outer casing is not particularly limited, as long as it is a material that is stable in electrolytes. As the material, examples include, but are not limited to, resins such as polypropylene, polyethylene and acrylic resins.

(6) Sulfide All-solid-state Battery

As the sulfide all-solid-state battery, examples include, but are not limited to, a lithium battery, a sodium battery, a magnesium battery and a calcium battery. Of them, the sulfide all-solid-state battery may be a lithium battery.

As the form of the sulfide all-solid-state battery, examples include, but are not limited to, a coin form, a laminate form, a cylindrical form and a square form.

EXAMPLES

Example 1

[Battery Forming]
[Production of Cathode]

In the air environment, a cathode active material was coated with a solid electrolyte ($LiNbO_3$) by use of a tumbling/fluidizing coater (manufactured by Powrex Corporation) and fired in the air environment to coat the surface of the cathode active material with the solid electrolyte.

Butyl butyrate, a 5% by mass butyl butyrate solution of a PVdF-based binder (manufactured by: Kureha Corporation), the cathode active material coated with the solid electrolyte, and a sulfide-based solid electrolyte (a $Li_2S$—$P_2S_5$-based glass ceramics containing LiBr and LiI) were put in a polypropylene (PP) container. Also, a conductive material (product name: VGCF; manufactured by: Showa Denko K. K.) was put in the container. The mixture was stirred by a ultrasonic disperser (product name: UH-50; manufactured by: SMT Co., Ltd.) for 30 seconds.

Next, the container was shaken by a shaker (product name: TTM-1; manufactured by: Sibata Scientific Technology Ltd.) for 3 minutes. Then, the mixture was further stirred with the ultrasonic disperser for 30 seconds.

The container was further shaken with the shaker for 3 minutes. Then, the mixture was applied onto an Al foil (manufactured by: Nippon Foil Mfg. Co., Ltd.) by a blade method using an applicator.

Then, the applied mixture was naturally dried to form an electrode.

Then, the electrode was dried on a hot plate at 100° C. for 30 minutes, thereby obtaining a cathode.
[Production of Anode]

Butyl butyrate, a 5% by mass butyl butyrate solution of a PVdF-based binder (manufactured by: Kureha Corporation), an anode active material (a natural graphite-based carbon manufactured by Nippon Carbon Co., Ltd., average particle diameter 10 μm) and a sulfide-based solid electrolyte (a $Li_2S$—$P_2S_5$-based glass ceramics containing LiBr and LiI) were put in a PP container. The mixture was stirred by the ultrasonic disperser (product name: UH-50; manufactured by: SMT Co., Ltd.) for 30 seconds.

Next, the container was shaken by the shaker (product name: TTM-1; manufactured by: Sibata Scientific Technology Ltd.) for 30 minutes.

The mixture was applied onto a Cu foil (manufactured by: Furukawa Electric Co., Ltd.) by the blade method using the applicator.

Then, the applied mixture was naturally dried to form an electrode.

Then, the electrode was dried on the hot plate at 100° C. for 30 minutes, thereby obtaining an anode.
[Production of Solid Electrolyte Layer]

Heptane, a 5% by mass heptane solution of a butadiene rubber (BR)-based binder (manufactured by: JSR Corporation) and a sulfide-based solid electrolyte (a $Li_2S$—$P_2S_5$-based glass ceramics containing LiBr and LiI, average particle diameter 2.5 μm) were put in a PP container. The mixture was stirred by the ultrasonic disperser (product name: UH-50; manufactured by: SMT Co., Ltd.) for 30 seconds.

Next, the container was shaken by the shaker (product name: TTM-1; manufactured by: Sibata Scientific Technology Ltd.) for 30 minutes.

Then, the mixture was applied onto an Al foil by the blade method using the applicator.

Then, the applied mixture was naturally dried to form an electrode.

Then, the electrode was dried on the hot plate at 100° C. for 30 minutes, thereby obtaining a solid electrolyte layer.
[Production of Sulfide all-Solid-State Battery]

The solid electrolyte layer was put in a 1 $cm^2$ mold and pressed at a pressure of 1 ton/$cm^2$ (≈98 MPa). The cathode was put in one side of the mold and pressed at a pressure of 1 ton/$cm^2$ (≈98 MPa). Also, the anode was put in the other side of the mold and pressed at a pressure of 6 ton/$cm^2$ (≈588 MPa). Therefore, a sulfide all-solid-state battery was obtained.
[Initial Charging]

The thus-obtained sulfide all-solid-state battery was put in a glass container filled with argon gas. In an environment at 25° C., the battery was charged with constant current-constant voltage (CCCV) at ⅓ C to 4.37 V, and then the battery was discharged with constant current-constant voltage at ⅓ C to 3 V. Then, the initial capacity of the battery was obtained.

Figure 4:
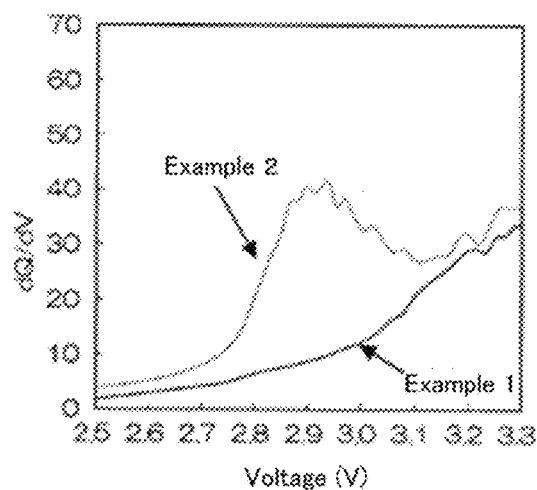
FIG. 4 shows dQ/dV curves of Examples 1 and 2 at the time of initial charging.

FIG. 4 shows the dQ/dV curve of Example 1 at the time of initial charging.
[After Initial Charging]

Then, the open-circuit voltage of the sulfide all-solid-state battery was controlled to 3.65 V, and the atmosphere in the glass container was changed from the argon gas atmosphere to a dry air atmosphere. Then, as a durability test, the open-circuit voltage of the sulfide all-solid-state battery was controlled to 4.25 V, and the sulfide all-solid-state battery was stored at 60° C. for 28 days.

Example 2

A sulfide all-solid-state battery was produced in the same manner as Example 1, except that at the time of the initial charging, the glass container was filled with a dry air atmosphere.

FIG. 4 shows the dQ/dV curve of Example 2 at the time of initial charging.

As shown in FIG. 4, for Example 1, the peak of the dQ/dV curve does not occur at the time of the initial charging. For Example 2, at the time of the initial charging, the peak of the dQ/dV curve occurs at around 2.9 V (2.8 to 3.0 V). This is supposed to be because the electrode reaction amount at around 2.9 V was increased by carrying out the initial charging in the oxygen-containing gas atmosphere.

Therefore, it is supposed that the same effects to those obtained at the time of the initially charging, are obtained by exposing the sulfide all-solid-state battery to the oxygen-containing gas atmosphere, with keeping a voltage of 2.8 to 3.0 V or more.

Example 3

A sulfide all-solid-state battery was produced in the same manner as Example 1, except that at the time of the initial charging, the glass container was filled with a dry air atmosphere, and at the time after the initial charging, the atmosphere in the glass container was changed to an argon gas atmosphere.

Comparative Example 1

A sulfide all-solid-state battery was produced in the same manner as Example 1, except that the argon gas atmosphere in the glass container was maintained even at the time after the initial charging.
[Capacity Retention Rate]

At 25° C., the sulfide all-solid-state battery obtained in Example 1 was discharged with constant current-constant voltage to 3 V, charged with constant current-constant voltage to 4.37 V, and then discharged with constant current-constant voltage to 3 V. Then, the capacity after endurance of the battery was obtained.

Next, the capacity retention rate of the battery was obtained from the capacity after endurance/the initial capacity. In the same manner, the capacity retention rates of the batteries of Examples 2 and 3 and Comparative Example 1 were obtained. Then, the capacity retention rate of Comparative Example 1 was determined as 100%, and the ratio of the capacity retention rate (capacity retention ratio) of Example 1 to Comparative Example 1 was calculated. In the same manner, the capacity retention ratios of Examples 2 and 3 were calculated. The results are shown in Table 1.

TABLE 1

| | Atmosphere at the time of the initial charging | Atmosphere at the time after the initial charging | Capacity retention ratio to Comparative Example 1 |
| --- | --- | --- | --- |
| Example 1 | Argon | Dry air | 1.10 |
| Example 2 | Dry air | Dry air | 1.13 |

TABLE 1-continued

| | Atmosphere at the time of the initial charging | Atmosphere at the time after the initial charging | Capacity retention ratio to Comparative Example 1 |
|---|---|---|---|
| Example 3 | Dry air | Argon | 1.11 |
| Comparative Example 1 | Argon | Argon | 1.00 |

As shown in Table 1, the ratio of the capacity retention rate (capacity retention ratio) to Comparative Example 1 is 1.10 in Example 1, 1.13 in Example 2, and 1.11 in Example 3.

As shown in Table 1, the capacity retention rate of Example 1 is 1.10 times higher than Comparative Example 1. Therefore, it is clear that the capacity retention rate is significantly increased by, at the time after the initial charging, controlling the battery voltage (open-circuit voltage) to 3.65 V and changing the atmosphere in the glass container from the argon gas atmosphere to the oxygen-containing gas atmosphere.

This is supposed to be due to the influence of the voltage kept even after the initial charging, since the effect of increasing the capacity retention rate was not obtained before the initial charging.

Also, as shown in Table 1, the capacity retention rate is higher in Example 2 than in Example 1. Therefore, it is clear that the capacity retention rate is increased higher than Example 1 (in which the initial charging was carried out in the argon gas atmosphere) by placing the sulfide all-solid-state battery in the oxygen-containing gas atmosphere immediately after its formation and initially charging the battery in that state.

Also, as shown in Table 1, the capacity retention rate is higher in Example 2 than in Example 3. Therefore, it is clear that the capacity retention rate is increased by exposing the sulfide all-solid-state battery to the oxygen-containing gas at not only the time of the initial charging, but also the time after the initial charging.

Example 4

A sulfide all-solid-state battery was produced and evaluated in the same manner as Example 1, except the following: in the initial charging, the battery was put in a glass container filled with a dry air atmosphere (dewpoint −75° C.) and charged until the potential of the anode reached 0.08 V (vs. Li/Li$^+$); the battery was discharged until the battery voltage reached 3 V, and the initial capacity of the battery was obtained; and then the battery was evaluated after the atmosphere in the glass container was substituted by argon gas.

Example 5

A battery was produced and evaluated in the same manner as Example 4, except that in the initial charging, the battery was charged until the potential of the anode reached 0.7 V (vs. Li/Li$^+$).

Example 6

A battery was produced and evaluated in the same manner as Example 4, except that in the initial charging, the battery was charged until the potential of the anode reached 0.85 V (vs. Li/Li$^+$).

Example 7

A battery was produced and evaluated in the same manner as Example 4, except that in the initial charging, the battery was charged until the potential of the anode reached 1.0 V (vs. Li/Li$^+$).

[Capacity Retention Rate]

The sulfide all-solid-state battery obtained in Example 4 was charged at 0.8 mA (end-of-discharge current 0.016 mAh) to 4.1 V, discharged at 0.5 mA (end-of-discharge current 0.16 mAh) to 3 V, and then charged to 3.9 V. The battery was stored at 60° C. for 28 days. Then, the capacity after endurance of the battery was obtained.

Next, the capacity retention rate was obtained from the capacity after endurance/the initial capacity. In the same manner, the capacity retention rates of the batteries of Examples 5 to 7 were obtained. Then, the capacity retention rate of Example 7 was determined as 100%, and the ratio of the capacity retention rate (capacity retention ratio) of Example 4 to Example 7 was calculated. In the same manner, the capacity retention ratios of Examples 5 and 6 were calculated. The results are shown in Table 2.

TABLE 2

| | Anode potential (V (vs. Li/Li$^+$)) at the time of ending the initial charging | Capacity retention ratio to Example 7 |
|---|---|---|
| Example 4 | 0.08 | 1.19 |
| Example 5 | 0.7 | 1.15 |
| Example 6 | 0.85 | 1.09 |
| Example 7 | 1.0 | 1.00 |

As shown in Table 2, the capacity retention ratio to Example 7 is 1.19 in Example 4, 1.15 in Example 5, and 1.09 in Example 6. From the results, it is clear that the capacity retention rate is further increased by controlling the anode potential to 0.85 V (vs. Li/Li$^+$) or less at the time of ending the initial charging. This is supposed to be because, by charging the battery until the potential of the anode reaches 0.85 V (vs. Li/Li$^+$) or less, the sulfide-based solid electrolyte in contact with the anode active material reacts with oxygen gas, and the high oxygen concentration layer is efficiently formed.

[TEM Observation of Interface]

Figure 5A:
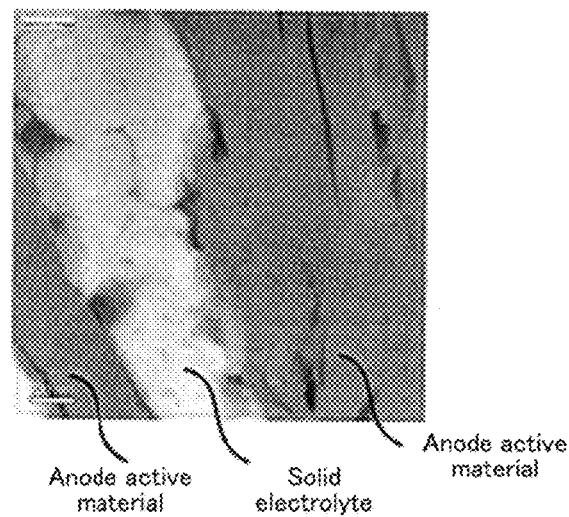
FIG. 5A is a TEM image of an anode obtained in Example 4.
Figure 5B:
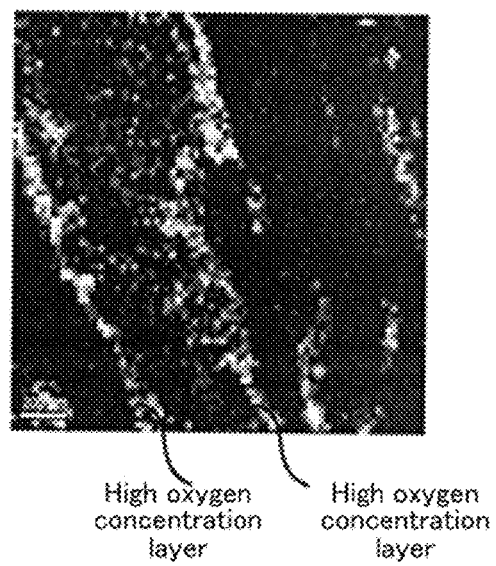
FIG. 5B is an EDX image of an oxygen component in the anode obtained in Example 4.

After the initial charging and discharging ended in the above "Initial charging", an interface between the anode active material and sulfide-based solid electrolyte in the anode of Example 4 was observed by use of a transmission electron microscope (TEM). FIG. 5A is a TEM image of the anode. FIG. 5B is an EDX image of an oxygen component. As shown in FIG. 5B, it was found that on the contact surface with the anode active material of the sulfide-based solid electrolyte, the high oxygen concentration layer having a higher oxygen concentration than other parts except the contact surface, was formed. It was also found that the high oxygen concentration layer was not formed on the surface that was not in contact with the anode active material or with the inside of the sulfide-based solid electrolyte. This is supposed to be because, by carrying out the initial charging in oxygen-containing gas atmosphere, only the contact surface with the anode active material of the sulfide-based solid electrolyte reacts with the oxygen gas and selectively forms the high oxygen concentration layer.

Comparative Example 2

A battery was produced and evaluated in the same manner as Example 4, except that the initial charging was not carried out.

[Battery Evaluation]

The sulfide all-solid-state battery obtained in Example 4 was charged at 0.8 mA (end-of-charge current 0.016 mAh) to 4.1 V, discharged at 0.5 mA (end-of-discharge current 0.16 mAh) to 3 V, and then charged to 3.9 V. Then, the voltage was controlled, and the battery resistance was obtained from a voltage decrease amount 5 seconds after discharging at 4.8 mA. In the same manner, the battery resistance of the sulfide all-solid-state battery obtained in Comparative Example 2 was obtained. The results are shown in FIG. 6.

Figure 6:
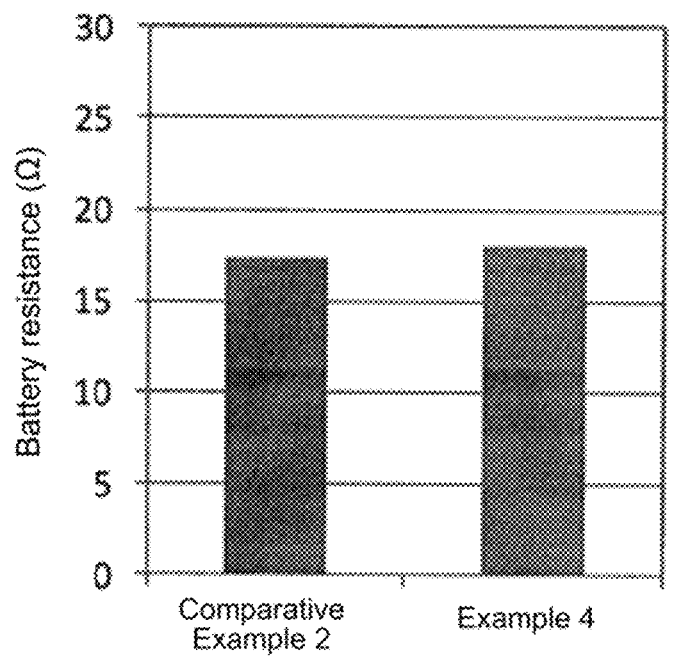
FIG. 6 shows measurement results of battery resistances of Example 4 and Comparative Example 2.

As shown in FIG. 6, it was confirmed that the battery resistance of Example 4 is almost the same value as the battery resistance of Comparative Example 2 in which the initial charging in the dry air atmosphere was not carried out. In general, the resistance of a battery (battery resistance) tends to increase as the oxygen content of a sulfide-based solid electrolyte increases. However, it is supposed that since the high oxygen concentration layer is selectively formed on the contact surface with the anode active material of the sulfide-based solid electrolyte by carrying out the initial charging in the oxygen-containing gas atmosphere, the oxygen content of the sulfide-based solid electrolyte is minimized and, with preventing an increase in the battery resistance, the capacity retention rate can be increased.

Reference Example 1

A sulfide-based solid electrolyte (a $Li_2S$—$P_2S_5$-based glass ceramics containing LiBr and LiI) was put in a 1 cm² mold and pressed at a pressure of 1 ton/cm² (≈98 MPa), thereby producing a solid electrolyte pellet.

A SUS current collector, the solid electrolyte pellet, an Li metal foil and another SUS current collector were stacked in this order, thereby producing an evaluation battery.

Reference Example 2

The evaluation battery produced in Reference Example 1 was put in a glass container filled with a dry air atmosphere (dewpoint −75° C.), charged until the potential of the anode reached 0.08 V (vs. $Li/Li^+$) and then discharged until the battery voltage reached 3 V.

Thereafter, the atmosphere in the glass container was substituted by argon gas, and the analysis evaluation of the battery was carried out.

Reference Example 3

An evaluation battery was produced in the same manner as Reference Example 2, except that the evaluation battery was not charged and discharged in a glass container filled with a dry air atmosphere (dewpoint −75° C.)

Reference Example 4

An evaluation battery was produced and evaluated in the same manner as Reference Example 2, except that the evaluation battery was put in a glass container filled with argon gas, charged until the potential of the anode reached 0.08 V (vs. $Li/Li^+$) and then discharged until the battery voltage reached 3 V.

[Analysis of Electrolyte]

For the evaluation battery of Reference Example 1, the oxygen content ratio (O/P) of the sulfide-based solid electrolyte to a sulfur element was calculated by RBS, PIXE, HFS and NRA analyses of the surface part that was in contact with the SUS current collector of the solid electrolyte. In the same manner, the oxygen content ratios (O/P) of the evaluation batteries obtained in Reference Examples 2 to 4 were calculated. The results are shown in FIG. 7.

Figure 7:
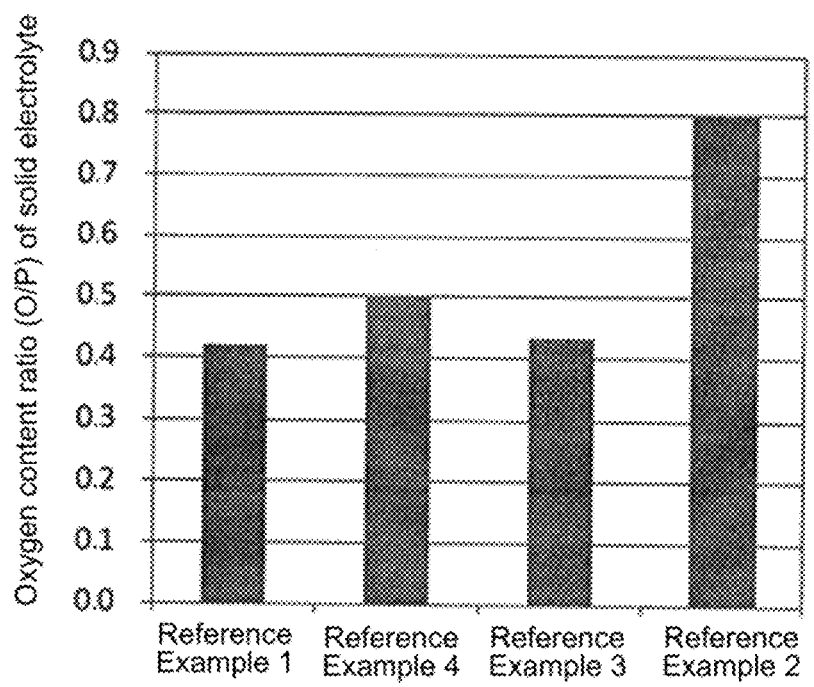
FIG. 7 shows measurement results of oxygen content ratios of solid electrolytes of Reference Examples 1 to 4.

As shown in FIG. 7, it was confirmed that the oxygen content ratio of the sulfide-based solid electrolyte of Reference Example 2 was increased significantly higher than Reference Example 1. Meanwhile, it was confirmed that the oxygen content ratios of the sulfide-based solid electrolytes of Reference Examples 3 and 4 were slightly increased compared to Reference Example 1. From these results, it is clear that the oxygen content ratio of the sulfide-based solid electrolyte is significantly increased by carrying out the initial charging in the oxygen-containing gas atmosphere. This is supposed to be because, by placing the sulfide-based solid electrolyte at a specific potential or lower in the oxygen-containing gas atmosphere, the sulfide-based solid electrolyte reacts with the oxygen gas, and the high oxygen concentration layer is efficiently formed.

The invention claimed is:

1. A method for producing a sulfide all-solid-state battery, the method comprising:
    forming the sulfide all-solid-state battery comprising a cathode comprising a cathode active material layer that contains a cathode active material, an anode comprising an anode active material layer that contains an anode active material, and a solid electrolyte layer disposed between the cathode and the anode, wherein at least one of the anode active material layer and the solid electrolyte layer contains a sulfide-based solid electrolyte,
    initially charging the sulfide all-solid-state battery after the forming of the sulfide all-solid-state battery, and
    exposing a contact surface between the sulfide-based solid electrolyte and the anode active material of the sulfide all-solid-state battery to an oxygen-containing gas atmosphere at a time of the initially charging of the sulfide all-solid-state battery and optionally at a time after the initially charging of the sulfide all-solid-state battery,
    wherein, in the initially charging of the sulfide all-solid-state battery, the sulfide all-solid-state battery is initially charged in the oxygen-containing gas atmosphere to set a potential of the anode of the sulfide all-solid-state battery to 0.85 V (vs. $Li/Li^+$) or less.

2. The method for producing the sulfide all-solid-state battery according to claim 1, wherein, in the initially charging of the sulfide all-solid-state battery, the sulfide all-solid-state battery is initially charged in the oxygen-containing gas atmosphere, and after the initially charging of the sulfide all-solid-state battery, the sulfide all-solid-state battery is exposed to the oxygen-containing gas atmosphere.

* * * * *